US009871429B2

United States Patent
Hasegawa et al.

(10) Patent No.: US 9,871,429 B2
(45) Date of Patent: Jan. 16, 2018

(54) STATOR YOKE FOR BICYCLE GENERATOR HUB

(75) Inventors: Hiroshi Hasegawa, Osaka (JP); Takeshi Fujiwara, Osaka (JP)

(73) Assignee: Shimano Inc., Osaka (JP)

( * ) Notice: Subject to any disclaimer, the term of this patent is extended or adjusted under 35 U.S.C. 154(b) by 231 days.

(21) Appl. No.: 13/551,480

(22) Filed: Jul. 17, 2012

(65) Prior Publication Data

US 2013/0049548 A1 Feb. 28, 2013

(30) Foreign Application Priority Data

Aug. 26, 2011 (JP) .................................. 2011-184383

(51) Int. Cl.
*H02K 15/00* (2006.01)
*H02K 15/02* (2006.01)
*H02K 1/14* (2006.01)
*B62J 6/12* (2006.01)
*H02K 7/18* (2006.01)

(52) U.S. Cl.
CPC .............. *H02K 15/022* (2013.01); *B62J 6/12* (2013.01); *H02K 1/145* (2013.01); *H02K 7/1846* (2013.01); *Y10T 29/49002* (2015.01)

(58) Field of Classification Search
CPC .. H02K 5/02; H02K 5/22; H02K 5/16; H02K 5/165; H02K 5/167; H02K 7/1846; H02K 1/12; H02K 1/145; H02K 15/022; H02K 33/00; H02K 33/02; B62J 6/12; H05K 13/00
USPC ......................................... 310/49, 67 A, 263
See application file for complete search history.

(56) References Cited

U.S. PATENT DOCUMENTS

| 2,243,318 | A | * | 5/1941 | Rawlings | ............... H02K 1/243 |
| | | | | | 310/156.67 |
| 3,305,740 | A | * | 2/1967 | Shano | ........................... 310/232 |
| 3,621,313 | A | * | 11/1971 | Walton | ................... G04C 13/11 |
| | | | | | 310/112 |
| 5,539,265 | A | * | 7/1996 | Harris et al. | ................... 310/263 |

(Continued)

FOREIGN PATENT DOCUMENTS

| AT | 162814 B | 4/1949 |
| CN | 101741201 A | 6/2010 |

(Continued)

OTHER PUBLICATIONS www.dictionary.com, definition of 'Unitary' and 'Integral' (Definitions attached).*

*Primary Examiner* — Bernard Rojas
*Assistant Examiner* — Rashad Johnson
(74) *Attorney, Agent, or Firm* — Global IP Counselors, LLP (57) ABSTRACT

A stator yoke is provided for a bicycle generator hub. The stator yoke includes a first tubular section and a plurality of first pole sections. The first tubular section has a first axial end and a second axial end. The first pole sections are integrally formed with the first tubular section as a one-piece, unitary member. Each of the first pole sections includes a first radially protruding section that extends from the first axial end of the first tubular section in a radial direction of the first tubular section, and a first axially protruding section that extends from the first protruding section in an axial direction of the first tubular section toward the second axial end of the first tubular section.

12 Claims, 5 Drawing Sheets

(56) References Cited

U.S. PATENT DOCUMENTS

| | | | | |
|---|---|---|---|---|
| 5,561,334 A * | 10/1996 | Ishida | ................... | H02K 9/06 |
| | | | | 310/263 |
| 6,133,669 A * | 10/2000 | Tupper | ................ | H02K 19/22 |
| | | | | 310/216.121 |
| 7,170,206 B2 * | 1/2007 | Laxenaire et al. | ............. | 310/43 |
| 7,466,058 B2 * | 12/2008 | Dubois | ................ | H02K 1/145 |
| | | | | 310/216.006 |
| 7,714,475 B2 * | 5/2010 | Enomoto | ............ | H02K 21/145 |
| | | | | 310/216.066 |
| 8,093,771 B2 * | 1/2012 | Liao | ........................ | B62J 6/12 |
| | | | | 310/257 |
| 8,278,789 B2 * | 10/2012 | Nakano | ................... | B62J 6/12 |
| | | | | 310/67 A |
| 8,952,590 B2 * | 2/2015 | Calley | ..................... | B62M 6/65 |
| | | | | 310/216.008 |
| 2008/0315716 A1 * | 12/2008 | Itoh et al. | ................... | 310/263 |
| 2010/0117494 A1 * | 5/2010 | Hasegawa | ................. | 310/67 A |
| 2010/0123371 A1 * | 5/2010 | Lin | ............................ | 310/67 A |
| 2010/0219711 A1 * | 9/2010 | Gruendl et al. | ......... | 310/156.25 |
| 2012/0161589 A1 * | 6/2012 | Hasegawa | ............. | H02K 21/22 |
| | | | | 310/67 A |

FOREIGN PATENT DOCUMENTS

| | | |
|---|---|---|
| DE | 20 2008 013 820 U1 | 4/2009 |
| JP | 54-109102 A | 8/1979 |
| JP | 2004-229403 A | 8/2004 |
| JP | 2006-14538 A | 1/2006 |
| JP | 2011-172463 A | 9/2011 |

\* cited by examiner

STATOR YOKE FOR BICYCLE GENERATOR HUB

CROSS-REFERENCE TO RELATED APPLICATIONS

This application claims priority under 35 U.S.C. §119 to Japanese Patent Application No. 2011-184383, filed Aug. 26, 2011. The entire disclosure of Japanese Patent Application No. 2011-184383 is hereby incorporated herein by reference.

BACKGROUND

Field of the Invention

This invention generally relates to a stator yoke. More specifically, the present invention relates to a stator yoke for a bicycle generator hub and a manufacturing method of a stator yoke for a bicycle generator hub.

Background Information

Regarding bicycle generator hubs, a claw pole type bicycle generator hub is conventionally known (e.g., Japanese Laid-Open Patent Publication No. 2004-229403). In this conventional generator hub, a stator yoke is provided that has two pole sections and a core section. Each pole section has a plurality of thin plate members. Each of the thin plate members is formed with a circular plate section and a plurality of pole pieces that are arranged on a circumferential edge of the circular plate section so as to be spaced apart from one another in a circumferential direction and bent so as to extend along an axial direction. The thin plate members are laminated in a thickness direction. The core section connects the two pole sections magnetically.

With this conventionally configured stator yoke, the core section is installed inside a coil bobbin and the pole sections are folded over from both sides of the coil bobbin such that the pole sections are overlaid in a thickness direction to assemble the stator yoke.

SUMMARY

With the conventional stator yoke configuration, a substantial amount of work is required to laminate the pole sections and to install the core section inside the bobbin when assembling the stator yoke. Consequently, the work of assembling the stator yoke is complex. One object of the present disclosure is to provide a stator yoke for a bicycle generator hub that can be assembled easily.

In accordance with a first aspect, a stator yoke is provided for a bicycle generator hub. The stator yoke comprises a first tubular section and a plurality of first pole sections. The first tubular section has a first axial end and a second axial end. The first pole sections are integrally formed with the first tubular section as a one-piece, unitary member. Each of the first pole sections includes a first radially protruding section that extends from the first axial end of the first tubular section in a radial direction of the first tubular section, and a first axially protruding section that extends from the first protruding section in an axial direction of the first tubular section toward the second axial end of the first tubular section.

With this stator yoke, the first pole sections and the first tubular section are provided as a one-piece integral unit. Thus, assembly of the stator yoke is completed by merely installing the first tubular section inside the coil bobbin. As a result, a stator yoke for a bicycle generator hub can be obtained which can be assembled easily.

A stator yoke for a bicycle generator hub according to a second aspect is the stator yoke according to the first aspect, wherein the first tubular section has an axial extending gap that extends in the axial direction of the first tubular section. With this aspect, the occurrence of an eddy current in the first tubular section can be suppressed.

A stator yoke fix a bicycle generator hub according to a third aspect is the stator yoke according to the first or second aspect, further comprising a plurality of second pole sections. Each of the second pole sections having a second radially protruding section overlying a corresponding one of the first radially protruding sections and a second axially protruding section overlying a corresponding one of the first axially protruding sections. With this aspect, a laminated yoke can be assembled easily by merely overlaying the second radially protruding sections onto the first radially protruding sections and overlaying the second axially protruding sections onto the first axially protruding sections.

A stator yoke for a bicycle generator hub according to a fourth aspect is the stator yoke according to the third aspect, further comprising a second tubular section disposed around the first tubular section. The second radially protruding sections extend from a first axial end of the second tubular section in a radial direction of the second tubular section, and the second axially protruding sections extend from the second radially protruding sections in an axial direction toward a second axial end of the second tubular section. With this aspect, by merely inserting the first tubular section into the second tubular section, the first axially protruding sections can be laminated onto radial-direction outward sides of the second axially protruding sections and the first radially protruding sections can be laminated onto axial-direction outward sides of the second radially protruding sections. Consequently, the stator yoke can be assembled even more easily. Also, since the two tubular sections, which can be inserted into the coil bobbin, also assume a laminated structure, the occurrence of iron loss in the cylindrical sections can be reduced.

A stator yoke for a bicycle generator hub according to a fifth aspect is the stator yoke according to the fourth aspect, wherein the second tubular section has an axial extending gap that extends in the axial direction of the second tubular section. With this aspect, the occurrence of an eddy current in the second tubular section can be suppressed.

A stator yoke for a bicycle generator hub according to a sixth aspect is the stator yoke according to the first or second aspect, wherein the first tubular section has a circular transverse cross section. With this aspect, the first tubular section is easily arranged in a centered manner inside the coil bobbin because the first tubular section has a circular cylindrical shape.

A stator yoke for a bicycle generator hub according to a seventh aspect is the stator yoke according to the fourth or fifth aspect, wherein each of the first and second tubular sections has a circular transverse cross section. With this aspect, the second tubular section arranged on the outside is easily arranged in a centered manner inside the coil bobbin because the second tubular section has a circular cylindrical shape.

A method of manufacturing a stator yoke for a bicycle generator hub according to an eighth aspect comprises obtaining a magnetic tubular member having a base section and a plurality of narrow pieces extending from the base section in an axial direction of the tubular member such that adjacent ones of the narrow pieces are separated by cutouts such that the narrow pieces are arranged along a circumferential direction of the tubular member. The method further comprises bending the narrow pieces to form a radially protruding section and an axially protruding section for each of the narrow piece such that the radially protruding sections extend in a radially outward direction with respect to from the base section and the axially protruding sections extend from the radially protruding sections in an axial direction from a first axial end of the base section toward a second axial end of the base section.

With this method of manufacturing a stator yoke for a bicycle generator hub, a cylindrical member made of a magnetic material is obtained which has several narrow pieces arranged adjacently along a circumferential direction with a plurality of cutout sections in-between. By bending the base ends of the narrow pieces of the tubular member obtained in a radially outward direction, radially protruding sections that extend in a radially outward direction from a base end of the cutout sections can be formed. Also, axially protruding sections that extend in an axial direction from one end of the tubular member to the other end can be formed by bending the narrow pieces at an intermediate portion of the radially protruding sections. As a result, a stator yoke having a plurality of pole sections can be manufactured from a single member with a good yield rate.

A method of manufacturing a stator yoke for a bicycle generator hub according to a ninth aspect is the method according to the eighth aspect, wherein the obtaining of the magnetic tubular member is obtained by first curving a quadrilateral plate, which has the narrow pieces separated by the cutouts in the quadrilateral plate, prior to the bending of the narrow pieces to form the radially protruding sections and the axially protruding sections. With this aspect, a stator yoke having a plurality of pole sections can be manufactured from a single quadrilateral plate-like member.

A method of manufacturing a stator yoke for a bicycle generator hub according to a tenth aspect is the method according to the eight aspect, wherein the obtaining of the magnetic tubular member is obtained by first forming a cylinder, which has the narrow pieces separated by the cutouts extending axially from the base section to a free end of the cylinder, prior to the bending of the narrow pieces to form the radially protruding sections and the axially protruding sections. With this aspect, the stator yoke can be manufactured more simply because a cylinder is used from the beginning.

A method of manufacturing a stator yoke for a bicycle generator hub according to an eleventh aspect comprises obtaining a magnetic quadrilateral plate having an end section and a plurality of narrow pieces extending from the end section such that adjacent ones of the narrow pieces are separated by cutouts that are parallel to one side of the quadrilateral plate. The method further comprises bending the narrow pieces to forma first protruding section and a second protruding section for each of the narrow pieces such that the first protruding sections extend in a direction perpendicular to the end section and the second protruding sections extend from the first protruding sections in a direction parallel to the end section. The method further comprises curving the end section in a direction perpendicular to the one side of the quadrilateral plate to form a tubular member after the bending of the narrow pieces to form the first protruding section and the second protruding section.

With this method of manufacturing a stator yoke for a bicycle generator hub, a plate-like member having a plurality of narrow pieces arranged adjacently along a circumferential direction with a plurality of cutouts in-between is made from a magnetic material. By bending the narrow pieces of the cylindrical member obtained from the plate-like member having the cutout sections, the radially protruding sections that extend outward from the base ends of the cutouts can be formed. Also, axially protruding sections that extend in an axial direction from one end of the tubular member to the other end can be formed by bending the narrow pieces at an intermediate portion of the radially protruding sections. As a result, a stator yoke having a plurality of pole sections can be manufactured from a single member with a good yield rate.

A method of manufacturing a stator yoke for a bicycle generator hub according to a twelfth aspect is the method according to any one of the eighth to eleventh aspects, wherein a gap that extends in an axial direction is formed in the tubular member. As a result, an eddy current can be suppressed.

With the stator yoke for a bicycle generator hub, assembly of the stator yoke can be completed by merely installing the first tubular section inside the coil bobbin. Consequently, the stator yoke for a bicycle generator hub can be assembled even more easily. With the method of manufacturing a stator yoke for a bicycle generator hub according to the present invention, a stator yoke having a plurality of pole sections can be manufactured from a single member.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
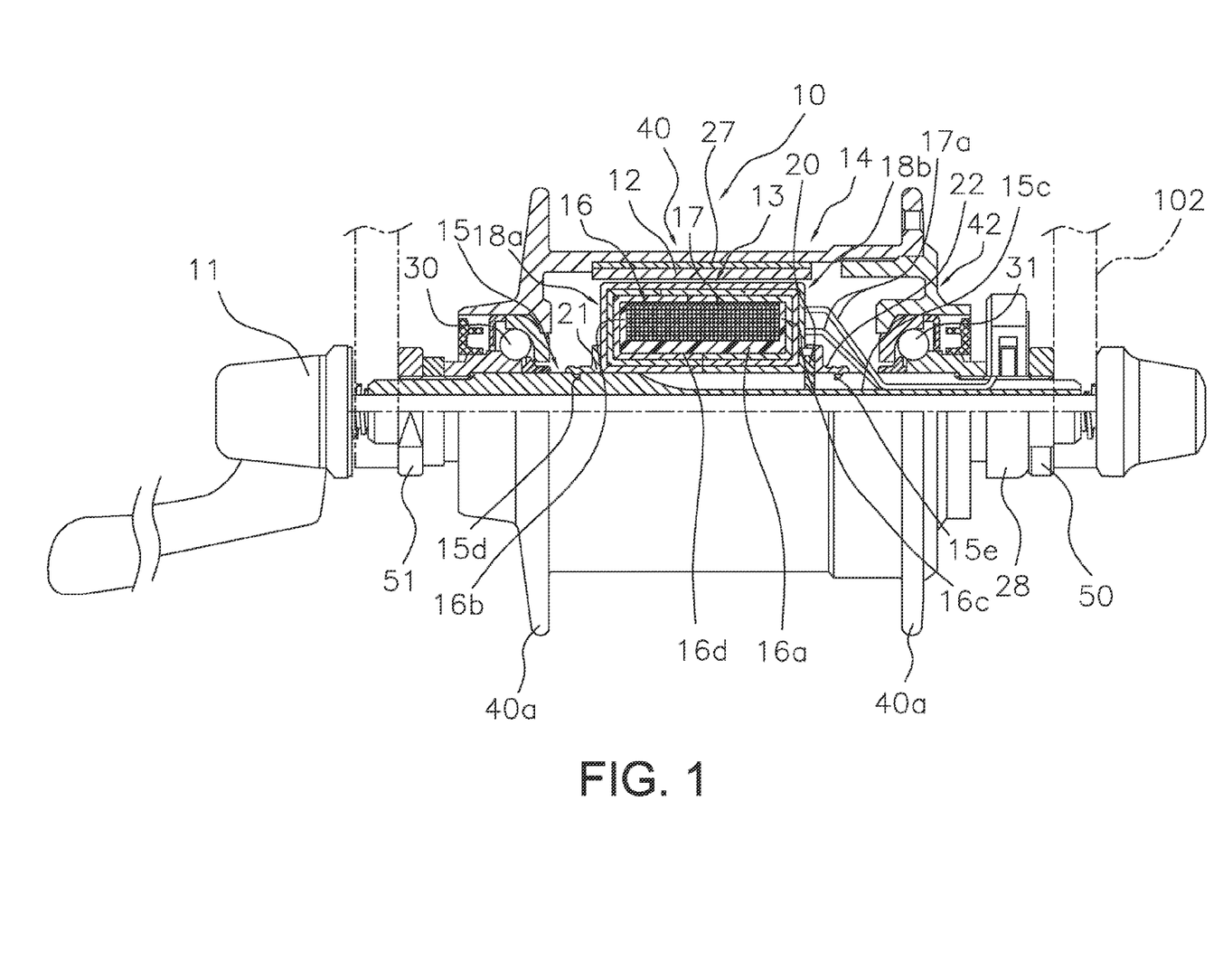
FIG. 1 is a half cross sectional view of a bicycle generator hub in which a stator having a pair of yokes in accordance with one illustrative embodiment.

Referring initially to FIG. 1, a bicycle generator hub 10 (e.g., a hub dynamo) is illustrated in accordance with one embodiment. As shown in FIG. 1, the bicycle generator hub 10 is installed on a front fork 102 of a bicycle. The generator hub 10 has an annular magnet 12, a stator 13, a hub shell 14 and a hub shaft 15. The hub shell 14 is attached rotatably to the hub shaft 15. The annular magnet 12 is provided on an internal circumferential surface of the hub shell 14. The magnet 12 has a plurality of magnetic poles arranged along a circumferential direction of the hub shell 14.

Figure 2:
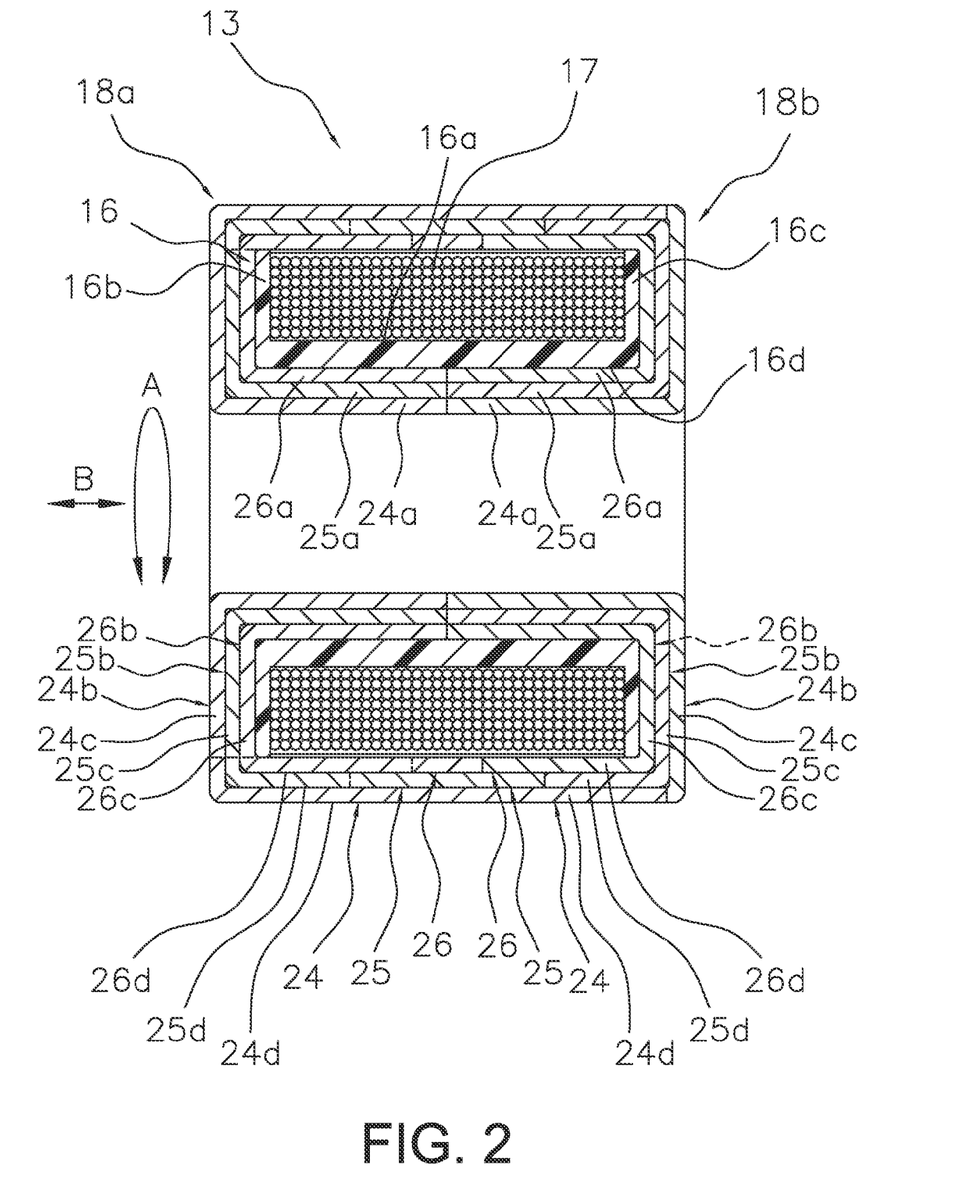
FIG. 2 is a cross sectional view of the stator of the bicycle generator hub illustrated in FIG. 1.
Figure 3:
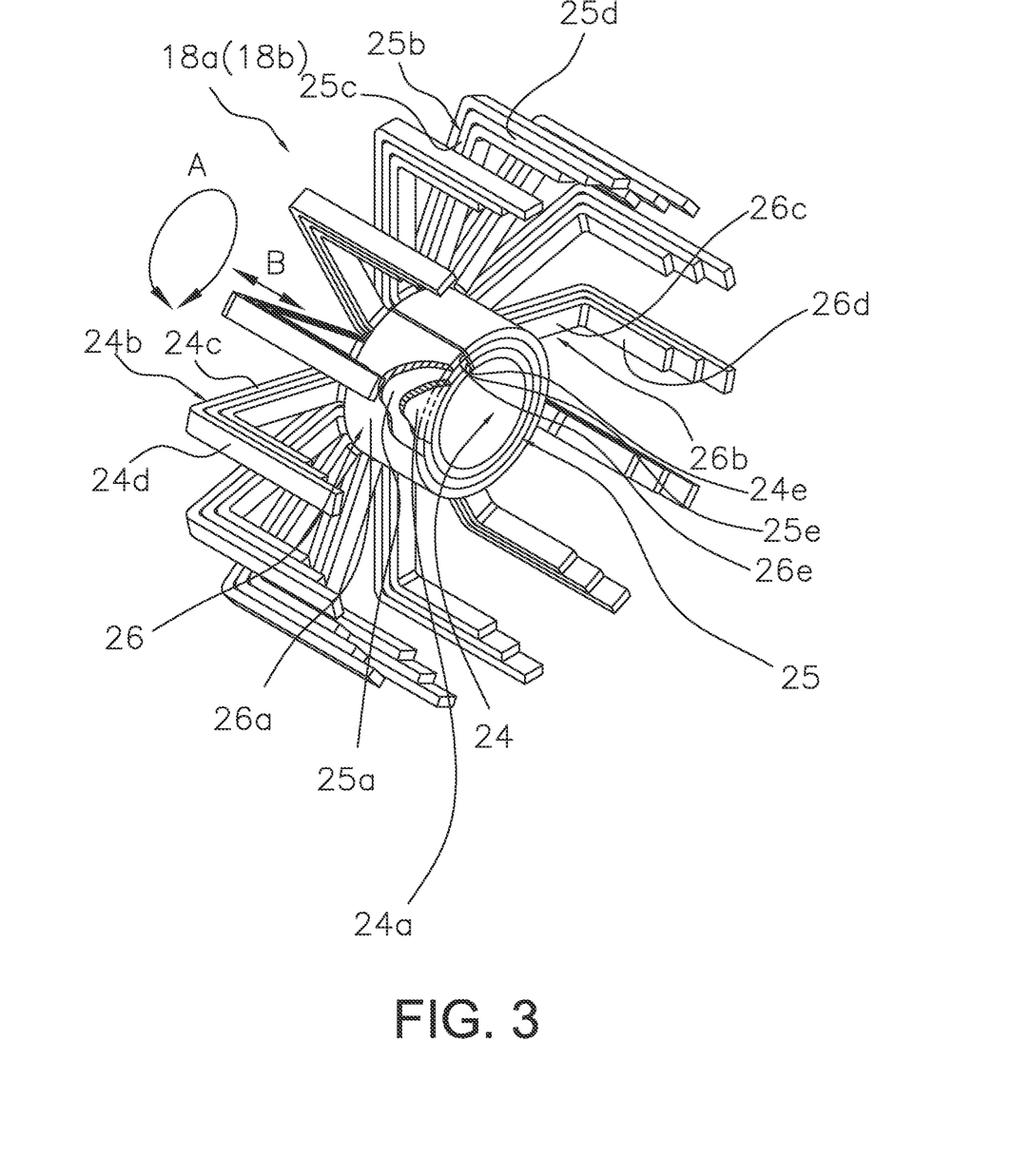
FIG. 3 is a perspective view of one of the stator yokes of the bicycle generator hub illustrated in FIG. 1.

The stator 13 basically includes a coil bobbin 16, a coil 17 and a pair of stator yokes 18a and 18b. The coil bobbin 16 is disposed on the hub shaft 15. The coil 17 is wound onto the coil bobbin 16. The yokes 18a and 18b are provided on the coil bobbin 16. In FIGS. 2, and 3, an arrow A indicates a circumferential direction of a coil bobbin 16. Also, arrow B indicates an axial direction of the coil bobbin 16. In this embodiment, the hub shaft 15, the coil bobbin 16, the stator yokes 18a and 18b (explained later) are arranged coaxially. Thus, the arrow A indicates a circumferential direction and the arrow B indicates an axial direction of all of these components.

The stator 13 is non-rotatably coupled to the hub shaft 15 by a coupling member 20 such that the stator 13 cannot rotate relative to the hub shaft 15. Thus, the coupling member 20 serves to couple the coil bobbin 16 and the hub shaft 15 together such that they cannot rotate relative to each other. The stator 13 is axially positioned in the B direction (axial direction) by a first positioning member 21 and a second positioning member 22 such that the stator 13 faces the magnet 12. The first positioning member 21 is arranged on a first side (left side in FIG. 1) of the coil bobbin 16 in the axial direction as indicated by the arrow B (axial direction, see FIG. 1). The coupling member 20 and the second positioning member 22 are arranged on a second side (right side in FIG. 1) of the coil bobbin 16 along the axial direction as indicated by the arrow B (see FIG. 1). The coupling member 20 is sandwiched between the second positioning member 22 and the coil bobbin 16.

The hub shaft 15 is hollow and detachably fastened to the front fork 102 by, for example, a quick release mechanism 11. A first externally threaded section 15a is formed on an external circumferential surface of a first end (left-hand end in FIG. 1) of the hub shaft 15. A second externally threaded section 15b is formed on an external circumferential surface of a second end (right-hand end in FIG. 2) of the hub shaft 15. Additionally, an axial groove 15c extending in an axial direction from a middle portion to the second end is formed in the external circumferential surface of the hub shaft 15. The axial groove 115c is used to arrange an electrical wire 17a that extends from the coil 17. A first annular groove 15d and a second annular groove 15e are formed in the external circumferential surface of the hub shaft 15 for crimping the first and second positioning members 21 and 22, respectively. The second annular groove 15e is configured to cut across the axial groove 15c. A depth of the axial groove 15c is larger than a depth of the second annular groove 15e in order to accommodate arranging the electrical wire 17a.

A connector 28 is provided for supplying electric power from the coil 17 to a headlamp or other external devices. The connector 28 is fixed onto the second end of the hub shaft 15 by a nut member 50 which screws onto the second externally threaded section 15b.

The coil 17 is wound onto the coil bobbin 16. The stator yokes 18a and 18b are attached to the coil bobbin 16 by an adhesive, for example. The coil bobbin 16 is positioned on the hub shaft 15 such that the coil bobbin 16 faces opposite an internal circumferential surface of the magnet 12. The coil bobbin 16 has a cylindrical section 16a, a first flange 16b and a second flange 16c. The cylindrical section 16a is wound on an external circumferential surface of which the coil 17. The first flange 16b is provided on a first end of the cylindrical section 16a (left side in FIG. 1) with respect to the axial direction as indicated by the arrow B. The second flange 16c is provided on a second end of the cylindrical section 16a (right side in FIG. 1) with respect to the axial direction as indicated by the arrow B. As shown in FIG. 1, the hub shaft 15 is inserted through a through hole 16d of the cylindrical section 16a. The coil bobbin 16 is non-rotatably coupled to the hub shaft 115 through the stator yoke 18b on the second side by the coupling member 20. The coupling member 20 non-rotatably couples the stator yokes 18a and 18b to the hub shaft 15.

A shown in FIG. 1, the coil 17 is wound onto the cylindrical section 16a of the coil bobbin 16. The coil 17 is made of a conductive metal wire material, such as a copper wire or an aluminum alloy wire. Two electrical wires 17a are electrically connected to both ends of the coil 17. The electrical wires 17a are provided to carry electric power generated in the coil 17 to the outside of the hub. The electrical wires 17a are arranged in the axial groove 15c explained previously.

As shown in FIGS. 2 and 3, the stator yoke 18a is arranged on the first flange 16b on the first end side of the coil bobbin 16 in the axial direction as indicated by the arrow B. The stator yoke 18b is arranged on the second flange 16c on the second end side of the coil bobbin 16 in the axial direction as indicated by the arrow B. The stator yokes 18a and 18b are made of silicon steel sheets (more specifically, non-oriented silicon steel sheets) on the surface of which an oxide film has been formed.

The stator yoke 18a and 18b are laminated yokes each having a first yoke member 24, a second yoke member 25 and a third yoke member 26. The first yoke member 24, the second yoke member 25 and the third yoke member 26 have the same thickness and are adhered together. Since the stator yoke 18a and 18b have the same constituent features, the explanation that follows will focus chiefly on the stator yoke 18a.

The first yoke member 24 has a first tubular section 24a and a plurality of first pole sections 24b (e.g., fourteen). The first tubular section 24a and the first pole sections 24b are integrally formed as a one-piece unitary member. The first tubular section 24a has a circular cylindrical shape. The first tubular section 24a is attached to an external circumferential surface of the hub shaft 15. As shown in FIG. 2, a dimension of the first tubular section 24a is set in the axial direction as indicated by the arrow B such that an first end face of the first tubular section 24a is positioned at a middle of the through hole 16d of the coil bobbin 16 in axial direction, i.e., the axial direction as indicated by the arrow B. An axially extending gap 24e is formed in the first tubular section 24a.

Each of the first pole sections 24b has a first radially protruding section 24c and a first axially protruding section 24d. The first radially protruding section 24c extends in a radial direction from a first end (left-hand end in FIG. 2 and FIG. 3) of the first tubular section 24a. The first radially protruding sections 24c are arranged in a radial form. The first axially protruding sections 24d extend from the first radially protruding sections 24c toward a second end of the first tubular section 24a along the axial direction as indicated by the arrow B.

The second yoke member 25 has a second tubular section 25a and a plurality of second pole sections 25b (e.g., fourteen). The second tubular section 25a and the second pole sections 25b are integrally formed as a one-piece unitary member. The second tubular section 25a has a circular cylindrical shape. The second tubular section 25a is attached to an external circumferential surface of the first tubular section 24a. Thus, the first tubular section 24a of the first yoke member 24 is inserted inside the second tubular section 25a. A dimension of the second tubular section 25a in the axial direction as indicated by the arrow B is set such that an end face of the second tubular section 25a is coplanar with the end face of the first tubular section 24a. An axially extending gap 25e is formed in the second tubular section 25a.

Each of the second pole sections 25b has a second radially protruding section 25c and a second axially protruding section 25d. The second radially protruding section 25c extends in a radial direction from a first end (left-hand end in FIG. 2 and FIG. 3) of the second tubular section 25a. The second radially protruding sections 25c are arranged in a radial form such that they overlap with the first radially protruding sections 24c. The second radially protruding sections 25c are arranged on an inward side (the first flange 16b side) of the first radially protruding sections 24c with respect to the axial direction.

The second axially protruding sections 25d extend from the second radially protruding sections 25c toward the other end of the second tubular section 25a along the axial direction as indicated by the arrow B. The first axially protruding sections 25d overlap the first axially protruding sections 24d from a radial direction. The second axially protruding sections 25d are arranged on a radially inward side of the first axially protruding sections 24d. Tip end portions of the second axially protruding sections 25d are arranged more toward the first end side than the first axially protruding sections 24d. Thus, the second axially protruding sections 25d are shorter in the axial direction than the first protruding sections 24d.

The third yoke member 26 has a third cylindrical section 26a and a plurality of third pole sections 26b (e.g., fourteen). The third cylindrical section 26a and the third pole sections 26b are integrally formed as a one-piece unitary member. The third cylindrical section 26a has a circular cylindrical shape. The third cylindrical section 26a is installed between an external circumferential surface of the second tubular section 25a and an internal circumferential surface of the through hole 16d of the coil bobbin 16. Thus, second tubular section 25a of the second yoke member 25 is inserted inside the third cylindrical section 26a. As shown in FIG. 3, a dimension of the third cylindrical section 26a in the axial direction as indicated by the arrow B is set such that an end face of the third cylindrical section 26a is coplanar with the end faces of the first tubular section 24a and the second tubular section 25a. An axially extending gap 26e is formed in the third cylindrical section 26a.

Each of the third pole sections 26b has a third radially protruding section 26c and a third axially protruding section 26d. The third radially protruding section 26c extends in a radial direction from a first end (left-hand end in FIG. 2 and FIG. 3) of the third cylindrical section 26a. The third radially protruding sections 26c are arranged in a radial form such that they overlap with the first radially protruding sections 24c and the second radially protruding sections 25c from an axial direction. The third radially protruding sections 26c are arranged on an inward side (the side with the first flange 16b) of the second radially protruding sections 25c with respect to the axial direction.

The third axially protruding sections 26d extend from the third radially protruding sections 26c toward the second end of the third cylindrical section 26a along the axial direction as indicated by the arrow B. Tip end portions of the third axially protruding sections 26d are arranged more toward the first end side than the second axially protruding sections 25d. Thus, the third axially protruding sections 26d are shorter in the axial direction than the second axially protruding sections 25d.

While the first, second and third cylindrical sections 24a, 25a and 26a are illustrated as having a circular transverse cross section, the first, second and third cylindrical sections 24a, 25a and 26a are not limited to a circular transverse cross section. Rather, the first, second and third cylindrical sections 24a, 25a and 26a can have other cross sectional shapes. Thus, the first, second and third cylindrical sections 24a, 25a and 26a can be more broadly considered to be first, second and third tubular sections.

As shown in FIG. 1, the hub shell 14 is rotatably supported on the hub shaft 15 by a first bearing 30 and a second bearing 31. A position of the first bearing 30 along the axial direction as indicated by the arrow B is adjusted with a nut member 51. The hub shell 14 has a cylindrical shell body 40 in which the first bearing 30 is arranged. A lid member 42 is attached to the shell body 40. The lid member 42 couples the second bearing 31 to the hub shell 14. Two hub flanges 40a are arranged on the shell body 40 to be spaced apart from each other along the axial direction as indicated by the arrow B and serve as a place where the hub shell 14 is connected to a rim using a plurality of spokes.

The magnet 12 is fixed to an internal circumferential surface of the shell body 40. A back yoke 27 is arranged between the magnet 12 and the shell body 40. An internal circumferential surface of the magnet 12 is arranged such that a slight gap exists between the internal circumferential surface of the magnet 12 and a radially outward portion of the stator 18a and a radially outward portion of the stator yoke 18b.

A method of manufacturing the first yoke member 24 of the stator yokes 18a and 18b will now be explained with reference to FIG. 4. The manufacturing methods of the second yoke member 25 and the third yoke member 26 are the same as the manufacturing method of the first yoke member 24, except that the dimensions of the second and third yoke members 25 and 26 are different.

Figure 4:
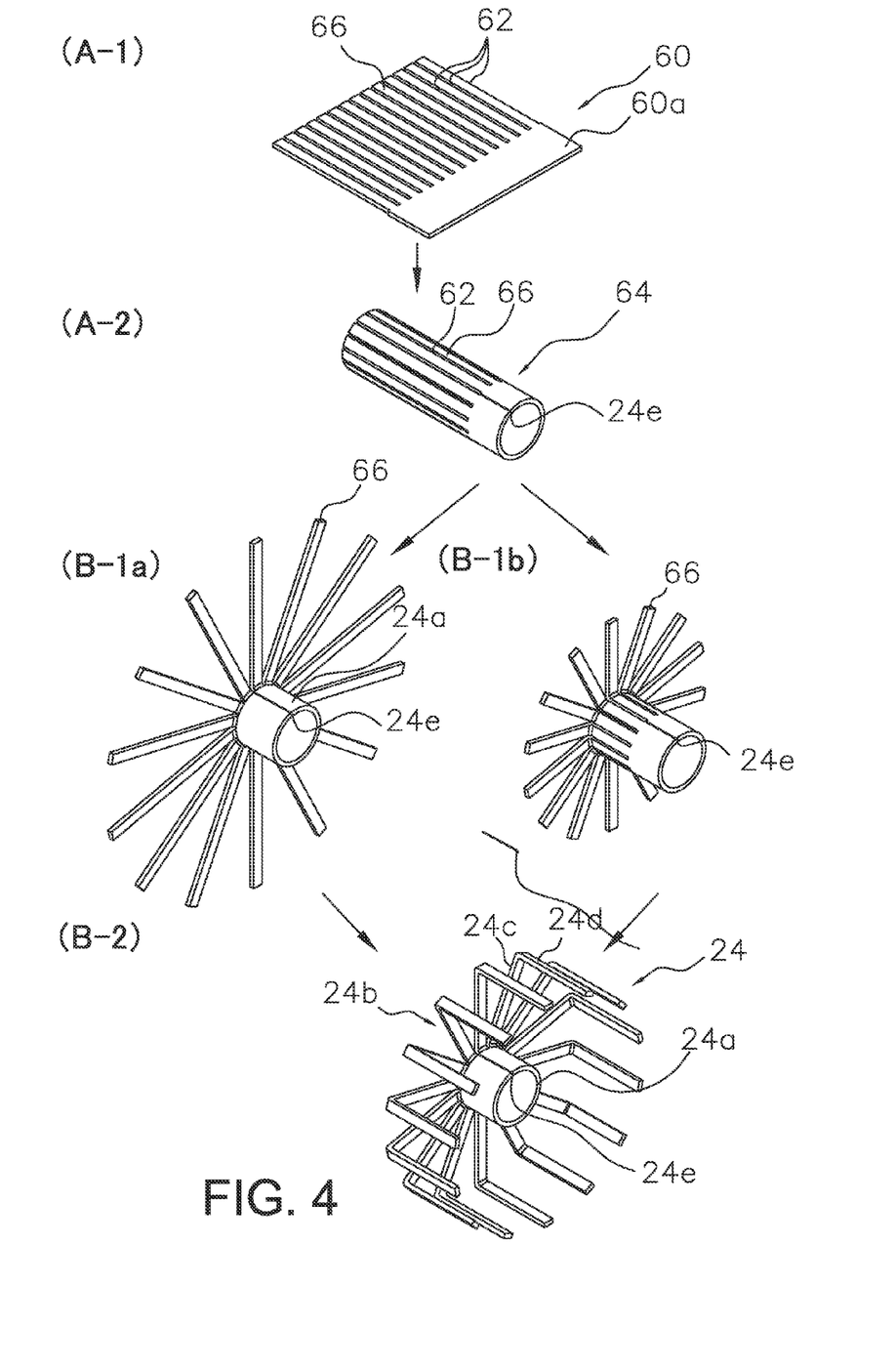
FIG. 4 is a perspective view showing a series of steps for manufacturing of the stator yokes of the bicycle generator hub illustrated in FIG. 1.

The manufacturing method of the first yoke member 24 basically comprises obtaining a quadrilateral plate-like member 60 as shown in part (A-1) of FIG. 4, then obtaining a first cylindrical member 64 from the quadrilateral plate-like member 60 as shown in part (A-2) of FIG. 4, and then obtaining the first tubular section 24a and the first pole sections 24b from the first cylindrical member 64 as shown in Part (B-2) of FIG. 4.

Prior to obtaining the first cylindrical member 64, the quadrilateral plate-like member 60 is prepared, which is made of a magnetic material, such as a silicon steel sheet (more specifically, non-oriented silicon steel sheet) on the surface of which an oxide film has been formed. As shown in Part (A-1) of FIG. 4, several narrow pieces 66 are provided on the plate 60 by forming a plurality of cutouts 62. The cutouts 62 are parallel and extend from the end section 60a of the plate 60. The cylindrical member 64 as shown in Part (A-2) of FIG. 4 is obtained by curving the plate 60 in a direction perpendicular to one side of the end section 60a that is parallel to the. After the plate 60 is bent into a cylinder, or a tubular member, the end section 60a forms a cylindrical end or a tubular end that constitutes a base section. It is preferable for contact not to occur at the seam formed in the cylindrical member 64 when the plate 60 is curved. That is, it is preferable for the axially extending gap 24e to be formed in the first tubular section 24a. As a result, an eddy current can be suppressed.

As shown in part (B1-a) of FIG. 4, in obtaining the first tubular section 24a and the first pole sections 24b, the narrow pieces 66 can be bent at right angles from the base ends of the cutouts 62 such that the narrow pieces 66 extend in radial directions of the cylindrical member 64 and are arranged in a radial form. Then, as shown in Part (B-2) of FIG. 4, the narrow pieces 66 are bent at right angles from an intermediate position such that tip end portions of the narrow pieces 66 extend parallel to the axial direction of the cylindrical section 24a.

Alternatively, as shown in part (B1-*b*) of FIG. 4, the narrow pieces 66 are first bent at right angles from an intermediate position of the cutouts 62 such that the narrow pieces 66 extend in radial directions of the cylindrical member 64 and are arranged in a radial form. Then, as shown in Part (B-2) of FIG. 4, the narrow pieces 66 are bent at right angles from the base such that tip end portions of the narrow pieces 66 extend parallel to the axial direction of the cylindrical section 24*a*.

As a result, regardless of whether the process of part (B1-*a*) of FIG. 4 or the process of part (B1-*b*) of FIG. 4 is used, the first radially protruding sections 24*c* and the first axially protruding sections are formed. In particular, the first radially protruding sections 24*c* extend outward in a radial direction of the cylindrical section 24*a* from the base ends of the cutouts 62 and the first axially protruding sections 24*d* that extend from the first radially protruding sections 24*c* at one axial end of the cylindrical member 64 toward the other end. In this way, the first yoke member 24 is obtained.

The second yoke member 25 and the third yoke member 26 are made such that the diameters of the first and second cylindrical members are successively larger than the diameter of the cylindrical member 64 and such that the first and second pole sections are successively longer.

Although in the previously explained embodiment the cylindrical member is obtained by curving a plate-like member, the method of obtaining the cylindrical member is not limited to such a method. For example, it is acceptable to obtain the cylindrical member by starting with a cylinder made of a magnetic material and providing a plurality of narrow pieces in the cylinder by forming a plurality of cutout sections that extend from one axial end of the cylinder toward the other axial end.

Figure 5:
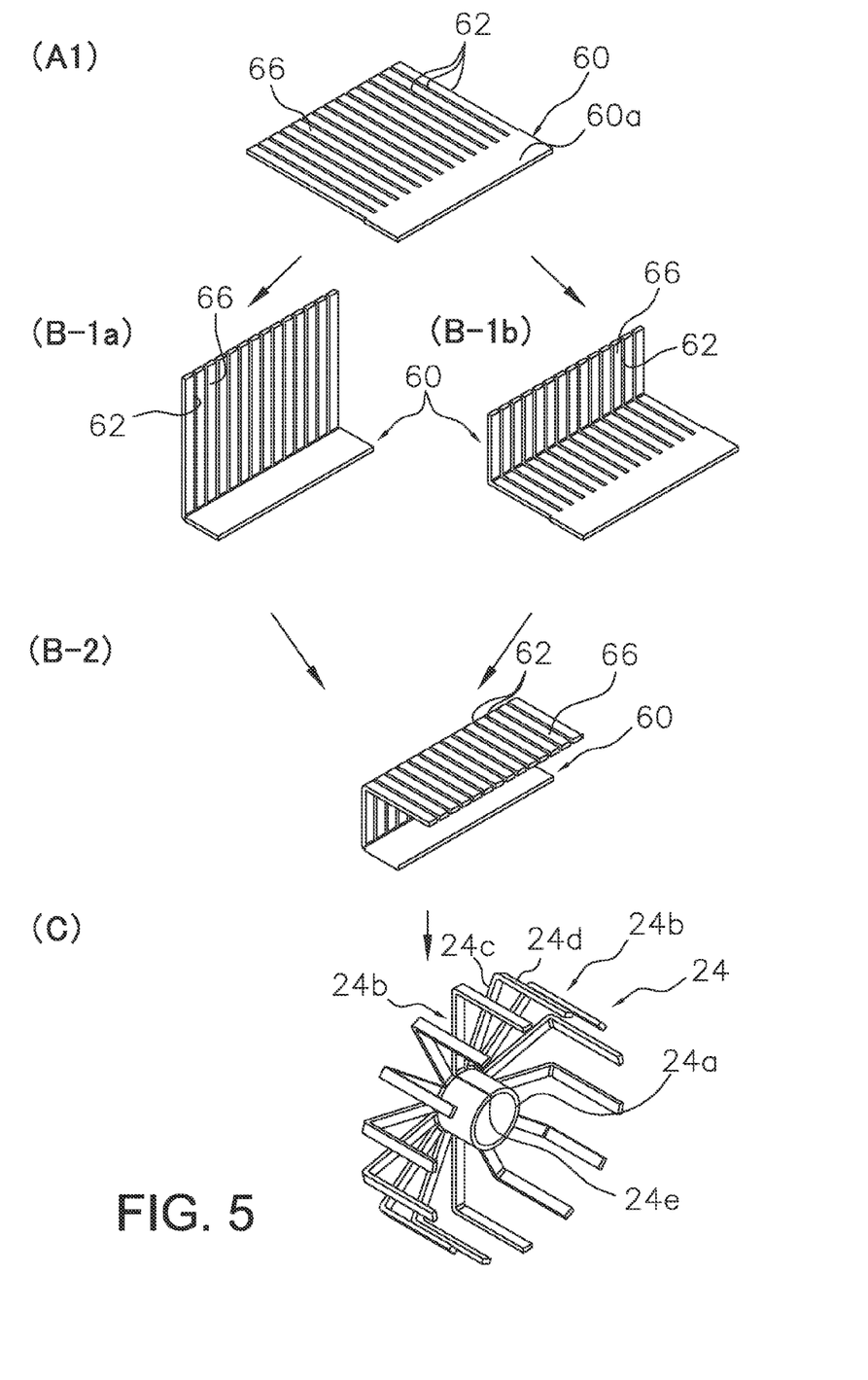
FIG. 5 is a perspective view, corresponding to FIG. 4, a series of steps for manufacturing of the stator yokes of the bicycle generator hub illustrated in FIG. 1 in accordance with an alternative manufacturing process.

Although in the previously explained embodiment the narrow pieces 66 are bent after the cylindrical member 64 is formed, the invention is not limited to such an approach. As shown in FIG. 5, it is acceptable to obtain the first yoke member 24 by successively executing a step of obtaining a plate-like member 60 having narrow pieces 66, a step of bending the narrow pieces 66, and a step of curving the plate 60 having the bent narrow pieces 66.

More specifically, the plate 60 is prepared which is made of a magnetic material, such as a silicon steel sheet (more specifically, non-oriented silicon steel sheet) on the surface of which an oxide film has been formed. As shown in part (A) of FIG. 5, the plate 60 having the narrow pieces 66 is obtained by forming in the plate 60 with the cutouts 62 that are parallel and extend from the end section 60*a* of the plate 60.

Afterwards, as shown in Part (B1-*a*) of FIG. 5, the narrow pieces 66 are bent at right angles from the base end of the cutouts 62. Then, as shown in Part (B2) of FIG. 5, the narrow pieces 66 are bent at right angles from an intermediate position of the cutouts 62 such that tip end portions of the narrow pieces 66 extend parallel to a portion where the cutouts 62 are not formed.

Alternatively, as shown in Part (B1-*b*) of FIG. 5, the narrow pieces 66 are bent at right angles from an intermediate position of the cutout portions 62, and then, as shown in Part (B2) of FIG. 5, the narrow pieces 66 are bent at right angles from the base end of the cutouts 62 such that tip end portions of the narrow pieces 66 extend parallel to a portion where the cutouts 62 are not formed.

As a result, regardless of whether the process of Part (B1-*a*) of FIG. 5 or the process of Part (B1-*b*) of FIG. 5 is used, the first radially protruding sections 24*c* and the first axially protruding sections 24*d* are formed. The first radially protruding sections 24*c* extend outward in a radial direction of the cylindrical member 64 from the base ends of the cutout portions 62. The first axially protruding sections 24*d* extend from the first radially protruding sections 24*c* from the first end of the cylindrical member 64 toward the second end.

Finally, the plate 60 with first radially protruding sections 24*c* and first axially protruding sections 24*d* formed by bending is curved in a direction perpendicular to the end section 60*a* to obtain a first yoke member 24 like that shown in Part (C) of FIG. 5.

Although in the previously explained embodiment the stator yoke is positioned in the circumferential direction by the first grooves and the second grooves, the method of positioning the stator yoke is not limited to this method. For example, instead of using grooves, it is acceptable to provide protrusions that contact at least both circumferential-direction sides one of the pole sections or one circumferential-direction side of one pole and the other circumferential-direction side of another pole.

Although in the previously explained embodiment the stator yokes 18*a* and 8*b* are substantially the same, the invention is not limited to such a configuration. For example, it is acceptable for the dimension of the cylindrical section of the yoke member in the axial direction as indicated by the arrow B to be different between the stator yoke 18*a* and 18*b*. In other words, it is acceptable for the connecting portion of the stator yokes 18*a* and 18*b* to be offset from the middle inside the through hole 16*d* of the coil bobbin 16.

Although in the previously explained embodiment each of the stator yokes 18*a* and 18*b* comprises through yoke members, the number of yoke members making up the stator yoke can be set to any number. For example, it is acceptable for the stator yoke to comprise one yoke member and it is acceptable for the stator yoke to comprise four yoke members.

Although in the previously explained embodiment the axial-direction dimensions of the axially protruding sections 24*d*, 25*d*, and 26*d* of the yoke members 24, 25, and 26 in the stator yoke 18*a* are different from one another, the invention is not limited to such a configuration. It is acceptable to provide each of the yoke members such that the axial-direction dimensions of the axially protruding sections of all of the yoke members of the stator yoke are the same.

Although in the previously explained embodiment the cylindrical sections have a three-layered structure, the structure of the cylindrical section can be set in any manner as appropriate. It is also acceptable for the cylindrical section to be arranged between the external circumferential surface of the hub shaft and the internal circumferential surface of the through hole of the coil bobbin and to be provided with first pole section formed as integral portions of the cylindrical section and at least one second pole section that is separate from the cylindrical section and overlaps with the first pole section such that it can be magnetically coupled to the cylindrical section.

Although in the previously explained embodiment a gap 24*e*, 25*e*, or 26*e* is provided in each of the first tubular section 24*a*, the second tubular section 25*a*, and the third cylindrical section 26*a*, the invention is not limited to such a configuration. It is acceptable if a gap is not provided in at least one of the cylindrical sections. In other words, it is acceptable if at least one of the yoke members is configured such that contact occurs at the seam when the cylindrical section is formed. In such a case, it is acceptable if the seam is joined with an adhesive or welded.

Thus, while only selected embodiments have been chosen to illustrate the present invention, it will be apparent to those skilled in the art from this disclosure that various changes and modifications can be made herein without departing from the scope of the invention as defined in the appended claims. In other words, the foregoing descriptions of the embodiments according to the present invention are provided for illustration only, and not for the purpose of limiting the invention as defined by the appended claims and their equivalents.

What is claimed is:

1. A stator yoke for a bicycle generator hub, the stator yoke comprising:
    a first tubular section having a first axial end and a second axial end, the first tubular section having a first single axially extending gap that extends in an axial direction of the first tubular section;
    a plurality of first pole sections formed with the first tubular section as a one-piece member, each of the first pole sections including a first radially protruding section that extends from the first axial end of the first tubular section in a radial direction of the first tubular section and a first axially protruding section that extends from the first radially protruding section in the axial direction of the first tubular section toward the second axial end of the first tubular section;
    a plurality of second pole sections, each of the second pole sections having a second radially protruding section overlying a corresponding one of the first radially protruding sections and a second axially protruding section overlying a corresponding one of the first axially protruding sections; and
    a second tubular section disposed around the first tubular section,
    the second radially protruding sections extending from a first axial end of the second tubular section in a radial direction of the second tubular section, and the second axially protruding sections extending from the second radially protruding sections in an axial direction toward a second axial end of the second tubular section,
    the second tubular section having a second single axially extending gap that extends in an axial direction of the second tubular section,
    the second axially extending gap being radially aligned with first axially extending gap.

2. The stator yoke as recited in claim 1, wherein each of the first and second tubular sections has a circular transverse cross section.

3. The stator yoke as recited in claim 1, wherein the first tubular section and the first pole sections being made from a single quadrilateral plate, the quadrilateral plate being made of a magnetic material.

4. A method of manufacturing a stator yoke for a bicycle generator hub, comprising:
    obtaining a first magnetic tubular member having a first base section and a plurality of first narrow pieces extending from the first base section in an axial direction of the first tubular member, adjacent ones of the first narrow pieces being separated by cutouts such that the first narrow pieces are arranged along a circumferential direction of the first tubular member, the obtaining of the fir magnetic tubular member including forming a first single axially extending gap that extends in the axial direction of the tubular member; and
    bending each of the first narrow pieces to form a first radially protruding section and a first axially protruding section for each of the narrow pieces, the first radially protruding sections extending in a radially outward direction with respect to from the first base section and the first axially protruding sections extending from the first radially protruding sections in an axial direction from a first axial end of the first base section toward a second axial end of the first base section;
    obtaining a second magnetic tubular member having a second base section and a plurality of second narrow pieces extending from the second base section in an axial direction of the second tubular member, adjacent ones of the second narrow pieces being separated by cutouts such that the second narrow pieces are arranged along a circumferential direction of the second tubular member, the obtaining of the second magnetic tubular member including forming a second single axially extending gap that extends in the axial direction of the tubular member; and
    bending each of the second narrow pieces to form a second radially protruding section and a second axially protruding section for each of the narrow pieces, the second radially protruding sections extending in a radially outward direction with respect to from the second base section and the second axially protruding sections extending from the second radially protruding sections in an axial direction from a first axial end of the second base section toward a second axial end of the second base section
    arranging the second tubular member around the first tubular member such that second axially extending gap is radially aligned with the first axially extending gap.

5. The method as recited in claim 4, wherein the obtaining of the first magnetic tubular member is obtained by curving a quadrilateral plate, which has the first narrow pieces separated by the cutouts in the quadrilateral plate, prior to the bending of the first narrow pieces to form the first radially protruding sections and the first axially protruding sections.

6. The method as recited in claim 4, wherein the obtaining of the first magnetic tubular member is obtained by forming a cylinder, which has the first narrow pieces separated by the cutouts extending axially from the first base section to a free end of the cylinder, prior to the bending of the first narrow pieces to form the first radially protruding sections and the first axially protruding sections.

7. A method of manufacturing a stator yoke for a bicycle generator hub, comprising:
    obtaining a first magnetic quadrilateral plate having a first end section and a plurality of first narrow pieces extending from the first end section, adjacent ones of the first narrow pieces being separated by cutouts that are parallel to one side of the first magnetic quadrilateral plate;
    bending each of the first narrow pieces to form a first protruding section and a second protruding section for each of the first narrow pieces, the first protruding sections extending in a direction perpendicular to the first end section and the second protruding sections extending from the first protruding sections in a direction parallel to the first end section; and
    curving the first end section in a direction perpendicular to the one side of the first magnetic quadrilateral plate to form a first tubular member after the bending of the first narrow pieces to form the first protruding section and the second protruding section, the curving of the first end section including forming a first single axially extending gap that extends in an axial direction of the first tubular member;

obtaining a second magnetic quadrilateral plate having a second end section and a plurality of first narrow pieces extending from the second end section, adjacent ones of the second narrow pieces being separated by cutouts that are parallel to one side of the second magnetic quadrilateral plate;

bending each of the second narrow pieces to form a first protruding section and a second protruding section for each of the second narrow pieces, the first protruding sections extending in a direction perpendicular to the second end section and the second protruding sections extending from the first protruding sections in a direction parallel to the second end section; and curving the second end section in a direction perpendicular to the one side of the second magnetic quadrilateral plate to form a second tubular member after the bending of the second narrow pieces to form the first protruding section and the second protruding section, the curving of the second end section including forming a second single axially extending gap that extends in an axial direction of the second tubular member, arranging the second tubular member around the first tubular member such that second axially extending gap is radially aligned with the first axially extending gap.

8. A stator yoke for a bicycle generator hub, the stator yoke comprising:

a first tubular section having a first axial end and a second axial end, the first tubular section having an axially extending gap that extends in an axial direction of the first tubular section; and a plurality of first pole sections extending from the first tubular section, the first tubular section and the first pole sections being formed from a single continuous piece of material, each of the first pole sections including a first radially protruding section that extends from the first axial end of the first tubular section in a radial direction of the first tubular section and a first axially protruding section that extends from the first radially protruding section in the axial direction of the first tubular section toward the second axial end of the first tubular section;

a plurality of second pole sections, each of the second pole sections having a second radially protruding section overlying a corresponding one of the first radially protruding sections and a second axially protruding section overlying a corresponding one of the first axially protruding sections; and a second tubular section disposed around the first tubular section, the second radially protruding sections extending from a first axial end of the second tubular section in a radial direction of the second tubular section, and the second axially protruding sections extending from the second radially protruding sections in an axial direction toward a second axial end of the second tubular section, the second tubular section having a second single axially extending gap that extends in an axial direction of the second tubular section, the second axially extending gap being radially aligned with first axially extending gap.

9. The stator yoke for a bicycle generator hub as recited in claim 8, wherein the axially extending gap passes through an entire axial thickness of the first tubular section in a radial direction of the tubular section.

10. The stator yoke for a bicycle generator hub as recited in claim 8, wherein the single axially extending gap passes through an entire radial thickness of the first tubular section in a radial direction of the tubular section.

11. The stator yoke for a bicycle generator hub as recited in claim 8, wherein the single continuous piece of material is a quadrilateral plate.

12. The stator yoke for a bicycle generator hub as recited in claim 8, wherein the single continuous piece of material is a thin plate material.

* * * * *